US012664103B2

(12) United States Patent
Chin et al.

(10) Patent No.: US 12,664,103 B2
(45) Date of Patent: Jun. 23, 2026

(54) PUSH METHOD FOR PERIPHERAL DEVICE REDIRECTION

(71) Applicant: Splashtop Inc., Cupertino, CA (US)

(72) Inventors: Victor Chin, San Jose, CA (US);
Hsien-Guo Wu, Taipei City (TW);
Wen-pin Tsai, Taipei City (TW)

(73) Assignee: SPLASHTOP INC., Cupertino, CA (US)

( * ) Notice: Subject to any disclaimer, the term of this patent is extended or adjusted under 35 U.S.C. 154(b) by 37 days.

(21) Appl. No.: 18/745,310

(22) Filed: Jun. 17, 2024

(65) Prior Publication Data

US 2025/0028655 A1    Jan. 23, 2025

Related U.S. Application Data

(60) Provisional application No. 63/513,973, filed on Jul. 17, 2023.

(51) Int. Cl.
*G06F 13/10* (2006.01)
*G06F 13/38* (2006.01)
*G06F 13/42* (2006.01)

(52) U.S. Cl.
CPC ........ *G06F 13/102* (2013.01); *G06F 13/4282* (2013.01); *G06F 2213/0042* (2013.01)

(58) Field of Classification Search
CPC .............. G06F 13/102; G06F 13/4282; G06F 2213/0042; G06F 13/385
USPC .............. 710/158, 19, 20, 29, 33, 46, 52, 62
See application file for complete search history.

(56) References Cited

U.S. PATENT DOCUMENTS

| | | | | | |
|---|---|---|---|---|---|
| 5,590,288 | A | * | 12/1996 | Castor | G06F 9/547 719/330 |
| 6,353,867 | B1 | * | 3/2002 | Qureshi | G06F 13/4027 710/305 |
| 6,389,501 | B1 | * | 5/2002 | Garney | G06F 13/4059 710/52 |
| 6,636,927 | B1 | * | 10/2003 | Peters | G06F 13/4059 710/305 |
| 7,284,061 | B2 | * | 10/2007 | Matsubayashi | G06F 3/1288 710/39 |
| 12,242,397 | B1 | * | 3/2025 | Teddy | G06F 13/4282 |
| 2006/0101179 | A1 | * | 5/2006 | Lee | G06F 13/364 710/113 |

(Continued)

*Primary Examiner* — Idriss N Alrobaye
*Assistant Examiner* — Henry W Yu
(74) *Attorney, Agent, or Firm* — PERKINS COIE LLP

(57) ABSTRACT

The performance of peripheral devices redirected to remote servers is improved by reducing overall input lag. Some embodiments provide a "push" method that includes a client computer repeatedly requesting data from a peripheral device to which it is connected. The client computer is connected to a remote server via a network connection, and it does not need to wait for a data request from the remote server to start or continue making requests to the peripheral device. This allows the client computer to redirect any response packets of data received from the peripheral device to a queue on the remote server as soon as they are made available by the peripheral device. The remote server can then bypass the network latency associated with sending a request to the client computer across the network connection and waiting for a response by retrieving any available response packets directly from its queue.

35 Claims, 9 Drawing Sheets

100

(56) References Cited

U.S. PATENT DOCUMENTS

| | | | | |
|---|---|---|---|---|
| 2007/0174033 A1* | 7/2007 | Huang | .................. | G06F 13/105 |
| | | | | 703/24 |
| 2008/0091932 A1* | 4/2008 | Mcnutt | ............... | G05B 19/054 |
| | | | | 713/1 |
| 2015/0254153 A1* | 9/2015 | Liao | ...................... | G06F 9/4411 |
| | | | | 710/18 |
| 2016/0055009 A1* | 2/2016 | Sakamoto | ............. | G06F 1/3287 |
| | | | | 710/14 |
| 2018/0349297 A1* | 12/2018 | Wilson | .................. | G06F 13/107 |

* cited by examiner

500

Local Host

Local host connects to a peripheral device
502

Local host receives a request via a network connection from a remote host for data from peripheral device
504

Local host requests data from peripheral device
506

Response packet(s) received from peripheral device?
508

No

Yes

Local host forwards packets to queue on remote host
510

Termination criteria met?
512

No

Yes

End

Remote Host
(Trigger Option)
800

Remote host connects to local host via network connection
802

Remote host periodically generates request for data from peripheral device
804

Push initiation criteria met?
806

Yes

No

Remote host forwards request to local host, via network connection
808

Response packet(s) present in queue?
810

Yes

No

Retrieve response packets from queue
812

End

PUSH METHOD FOR PERIPHERAL DEVICE REDIRECTION

CROSS-REFERENCE TO RELATED APPLICATIONS

This application claims priority to provisional patent application Ser. No. 63/513,973, filed Jul. 17, 2023, which application is incorporated herein in its entirety by this reference thereto.

FIELD

Various of the disclosed embodiments concern a push method for peripheral device redirection.

BACKGROUND

Peripheral devices are auxiliary internal or external devices that connect to a computer device and are used to send information in or out of the computer. Many peripheral devices are capable of providing extra functionality to a computer. Input peripheral devices provide information to a computer in a format that can be processed by the computer. For example, a keyboard is an input peripheral device that can send data regarding a user's keystrokes to a computer where it can be displayed as characters. The delay between the time that an input occurs on the peripheral device and the time that the information is processed by the computing device and a response, such as a display change, occurs is known as input lag. In some use cases, such as gaming, digital art, remote surgery, or remote infrastructure construction, reducing input lag between the peripheral device and the computer is important.

SUMMARY

Input lag issues can be exacerbated when trying to redirect the functionality of a peripheral device to a remote server while the peripheral device is physically connected to a local computer. In a common method of data transfer, data is broken up into packets and sent to a destination. Often, a request for data is initiated on the remote server which is then sent across the network connection to the local computer. The local computer then sends the response packets of data it retrieves from the peripheral device back across the network connection to the remote server. The extra time it takes for these data transfers to occur is called network latency and it can increase overall input lag.

The embodiments disclosed herein describe methods, apparatuses, and systems for improving the performance of peripheral devices redirected to remote servers by reducing overall input lag. Some embodiments may address this technical problem with a "push" method that includes a client computer repeatedly requesting data from a peripheral device to which it is connected. The client computer is connected to a remote server via a network connection, and it does not need to wait for a data request from the remote server to start or continue making requests to the peripheral device. This allows the client computer to redirect any response packets of data received from the peripheral device to a queue on the remote server as soon as they are made available by the peripheral device. The remote server can then bypass the network latency associated with sending a request to the client computer across the network connection and waiting for a response by retrieving any available response packets directly from its queue.

In some embodiments, the local computer may wait until it receives an initial request for peripheral device data from the remote server before beginning to make repeated requests to the peripheral device.

In some embodiments, the local computer may wait until it has detected that some defined "push" initiation criteria have been met, such as the connection of the peripheral device to the local computer, before beginning to make repeated requests to the peripheral device.

In some embodiments, the local computer may wait until it has detected that some defined termination initiation criteria have been met, such as the disconnection of the peripheral device from the local computer, before discontinuing the requests.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

Figure 1:
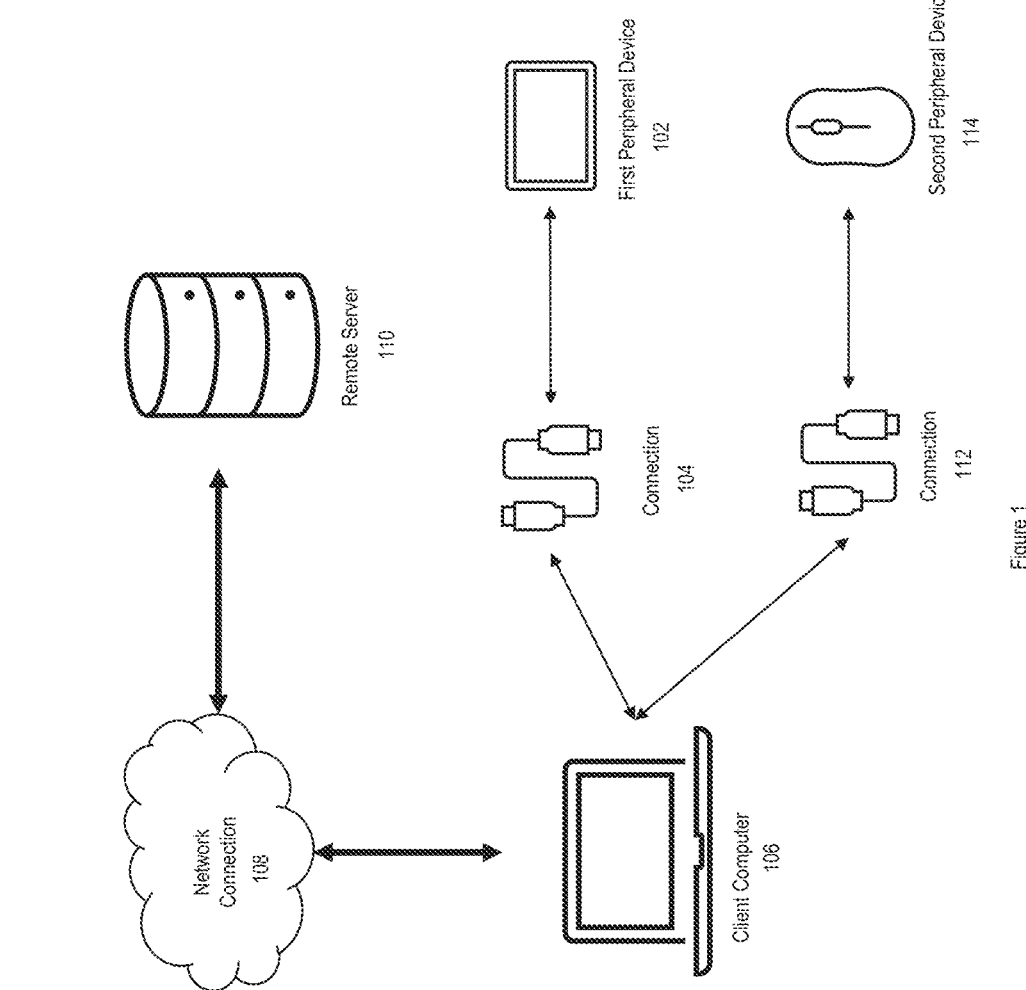
FIG. 1 depicts an example of a system for redirection of a peripheral device, connected to a local host, to a1, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

System Descriptions

FIG. 1 depicts an example of a system for redirection of a peripheral device, connected to a local host, to a remote host, in accordance with some embodiments. The system 100 includes a first peripheral device 102 and a second peripheral device 114. The first peripheral device 102 and second peripheral device 114 shown are external devices that connect directly to a computing device and can provide extra functionality to a user. While shown as a tablet and a computer mouse, the first peripheral device 102 and second peripheral device 114 may include other types of hardware devices such as a game controller, a keyboard, a microphone, a webcam, an external hard drive, etc. In some embodiments, a peripheral device can include an internal device, such as a graphics card, an internal hard drive, etc. In some embodiments, the first peripheral device 102 may communicate with a client computer 106 via a connection 104. While shown as a USB cable, the connection 104 may include other types of wired connections such as HDMI, VGA, serial ports, etc., or other types of wireless connections such as Bluetooth, Wi-Fi, etc. The client computer 106, while shown as a laptop, may include other types of computing devices such as a desktop computer, a wearable headset, a smartphone, etc. The client computer 106 communicates with a remote server 110 via a network connection 108. The remote server 110 may include other types of hardware computing devices or a type of virtual machine. The network connection may include the Internet, a local area network, a peer-to-peer network, etc.

The remote server 110 may use a communication protocol, such as Transmission Control Protocol/Internet Protocol (TCP/IP), User Datagram Protocol (UDP), etc., to send an initial request for data from the first peripheral device 102 to the client computer 106 via the network connection 108. The client computer 106 may then, in response to receiving the initial request for data from the remote server 110, send a request for data to the first peripheral device 102. The client computer 106 uses the communication protocol to forward response packets containing data received from the first peripheral device 102 to the remote server 110 via the network connection 108. The response packets are placed in a queue on the remote server 110 where the remote server 110 can retrieve them on a FIFO (first in, first out) basis. This process of redirection allows the remote server 110 to communicate with the first peripheral device 102.

In some embodiments, the input lag between an input on the first peripheral device 102 and a response on the remote server 110 may be reduced by having the client computer 106 continue to initiate requests for data from the first peripheral device 102. In some embodiments, the client computer 106 may initiate the requests without requiring another request from the remote server 110 and forward any response packets received from the first peripheral device 102 to the queue on the remote server 110. The remote server 110 can then fetch the response packets directly from the queue whenever it generates a new request for data from the peripheral device.

For example, the second peripheral device 114, a computer mouse, can be connected via connection 112, a USB cable, to the client computer 106, a laptop. The client computer 106 may include redirection functionality such that the second peripheral device 114 can be used on the remote server 110 connected to the client computer 106 by the network connection 108. The remote server 110 periodically sends requests for data to the client computer 106 which the client computer 106 forwards to the second peripheral device 114. When the second peripheral device 114 is moved, data packets containing information about the movement are made available to the client computer 106 via the connection 112. When the client computer 106 forwards a request to the second peripheral device 114, it receives the data packets in response. The client computer 106 then redirects those response packets to a queue on the remote server 110 where the remote server 110 can retrieve them and process the movement. The client computer 106 may also start to "push" data to the remote server 110 by repeatedly to sending requests for data to the second peripheral device 114, without waiting for requests from the remote server 110. Whenever the second peripheral device 114 provides data from movements, the client computer 106 forwards the response packets to the queue on the remote server 110. When the remote server 110 triggers another request for data, it may retrieve any available response packets directly from its queue, without needing to send the request to the client computer 106 and wait until the client computer 106 sends the data back across the network connection 108.

In some embodiments, the client computer 106 does not wait for an initial request from the remote server 110, and the client computer 106 detects whether certain "push" initiation criteria have been met to trigger the generation of the repeated requests for data from the first peripheral device 102. These initiation criteria may include actions, such as the connection of the first peripheral device 102 to the client computer 106, the connection of the remote server 110 to the client computer 106, a signal to start requests generated on the client computer 106, or a signal to start requests generated on the remote server 110. In some embodiments, the client computer 106 may stop making repeated requests when it detects that some termination criteria have been met. In some embodiments, the termination criteria may include a power-saving parameter such as a specified duration over which no response packets are received from the first peripheral device 102. In some embodiments, the termination criteria may include the disconnection of the first peripheral device 102 from the client computer 106, the disconnection of the remote server 110 from the client computer 106, a signal to stop requests generated on the client computer 106, or a signal to stop requests generated on the remote server 110.

In some embodiments, the first peripheral device 102 is an external tablet device connected to the client computer 106 via connection 104, a USB cable. The client computer 106 may have a USB stub driver installed on it that can be used to communicate, using TCP/IP, with a virtual host controller interface (VHCI) driver installed on the remote server 110 via the network connection 108. The stub driver may repeatedly check for endpoint data from the first peripheral device 102 via connection 104 and forward any available data packets to the queue on the remote server 110. The VHCI driver may then retrieve the data packets in the queue on subsequent requests for data from the first peripheral device 102.

As shown in the system 100, multiple peripheral devices may be connected to the client computer 106 or other computing devices. In such a system, the client computer 106 may initiate repeated requests for data to each peripheral device independently. In some embodiments, the client computer 106 may combine multiple data points and requests received from one or more peripheral devices into a single packet and then send it to the remote server 110. The combination may be triggered by various events, such as the client computer 106 detecting that the rate of consumption at the remote server 110 is low compared to the rate of data generation on the one or more peripheral devices. This process may be used to reduce network congestion and improve performance by reducing the number of packets the client computer 106 must send across the network.

For example, the first peripheral device 102 and the second peripheral device 114 may both be connected to the client computer 106 and configured to redirect their functionality to the remote server 110. A user may be using the first peripheral device 102 and the second peripheral device 114 frequently, causing response packets to be placed in the queue on the remote server 110 at a much faster rate than the remote server 110 can retrieve the response packets for processing. The client computer 106 may combine two or more response packets from the first peripheral device 102 into a single packet before sending it to the queue on the remote server 110. The client computer 106 may also combine one or more response packets from the first peripheral device 102 and one or more response packets from the second peripheral device 114 into a single packet before sending it to the queue on the remote server 110. Each device's response data adds a header to identify the source, and then merges and sends. The remote server separates the combined response packets based on the information in the header and assigns the packets to a specific target. This process of packet combination may reduce the backlog of response packets in the queue on the remote server 110.

Though the system 100 shows only one remote server 110 connected to the client computer 106, multiple remote servers may be connected to the client computer 106 or other computing devices.

Figure 2:
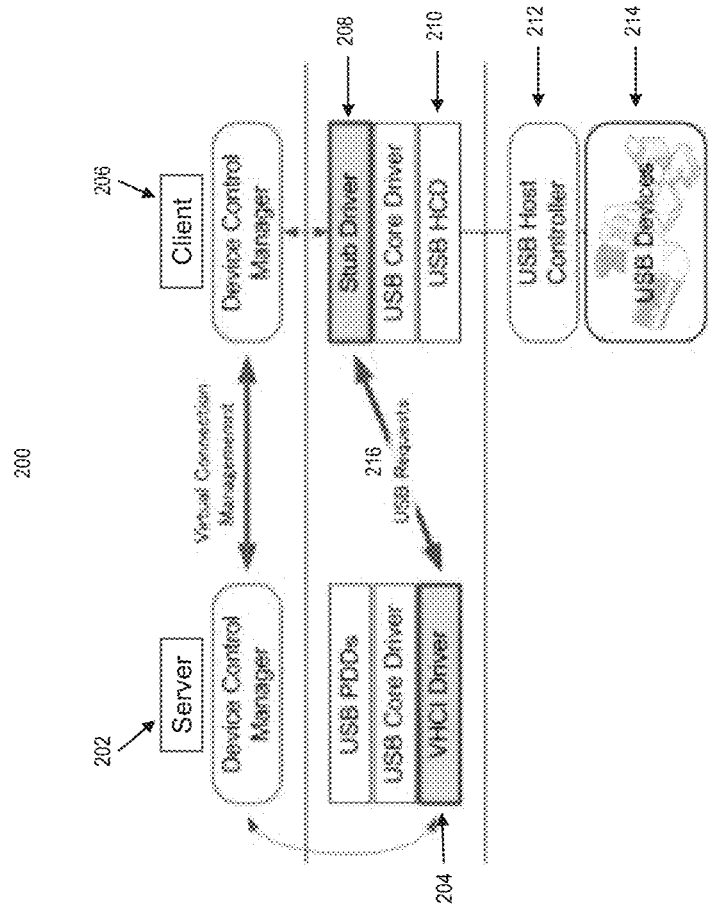
FIG. 2 shows an example of an architecture for redirection of one or more USB devices, connected to a client computer, to a server, in accordance with some embodiments.

FIG. 2 shows an example of an architecture 200 for redirection of one or more USB devices, connected to a client computer, to a server, in accordance with some embodiments. The USB devices 214 may include any peripheral devices, such as those described for the first peripheral device 102 in the system 100, that connect to the client computer 206 via a wired USB connection. The client computer 206 may include various types of computing devices, such as those described for the client computer 106 in system 100. The server 202 may include devices, such as those described for the remote server 110 in system 100. The client computer 206 and server 202 are connected via a network connection that may include various types of connections, as described by the network connection 108 in system 100.

A USB host controller driver (HCD) 210 installed on the client computer 206 transmits information to and from the USB devices 214 via the USB host controller 212. A stub driver 208 installed on the client computer 206 allows the USB devices 214 to be shared between the client computer 206 and the server 202 with their full functionality, by transmitting USB requests 216 in IP packets to and from a VHCI driver 204 installed on the server 202.

Figure 3:
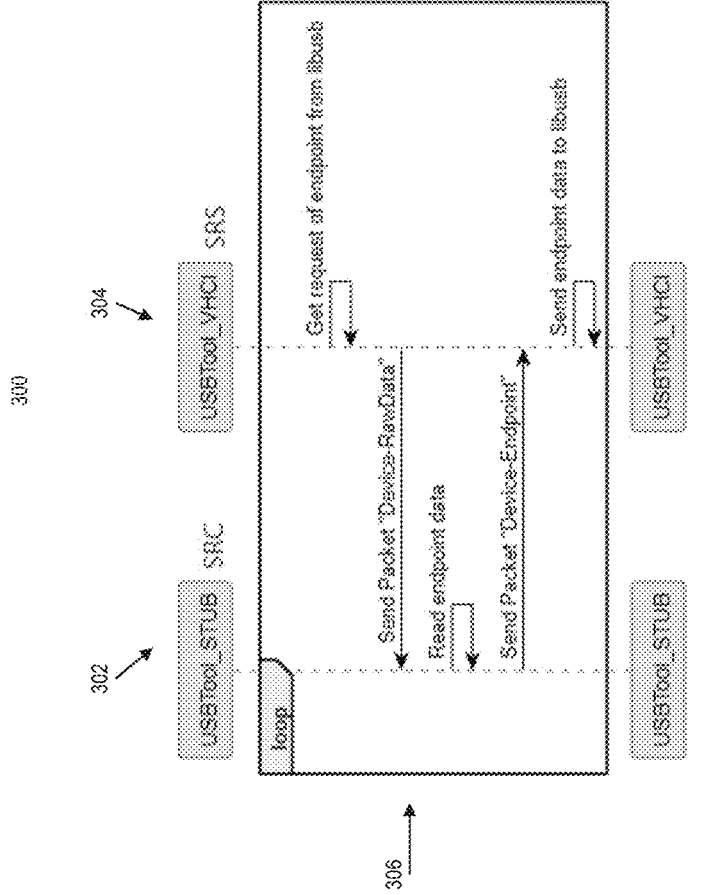
FIG. 3 depicts an example of a first workflow for redirection of a USB device, in accordance with some embodiments.

FIG. 3 depicts an example of a first workflow for redirection of a USB device, in accordance with some embodiments. As depicted in the first workflow 300, a USB device may be connected, via a client computer, to a server using a stub driver 302 installed on the client computer and a VHCI driver 304 installed on the server. The VHCI driver 304 may get a request from the server for endpoint data of a USB device from a program installed on the server using libusb. libusb is a C library that provides generic access to USB devices. The VHCI driver 304 may send a packet containing a command to read data from the USB device to a stub driver 302. This packet is exemplified in system 300 by 'Packet "Device-RawData".' The stub driver 302 may read endpoint data available from the USB device and may send the data in packets to the VHCI driver 304. These data packets are exemplified in system 300 by 'Packet "Device-Endpoint".' The VHCI driver 304 may then send the data to a program using libusb that is installed on the server. The process 306 may then be repeated for additional USB requests generated by the server.

Figure 4:
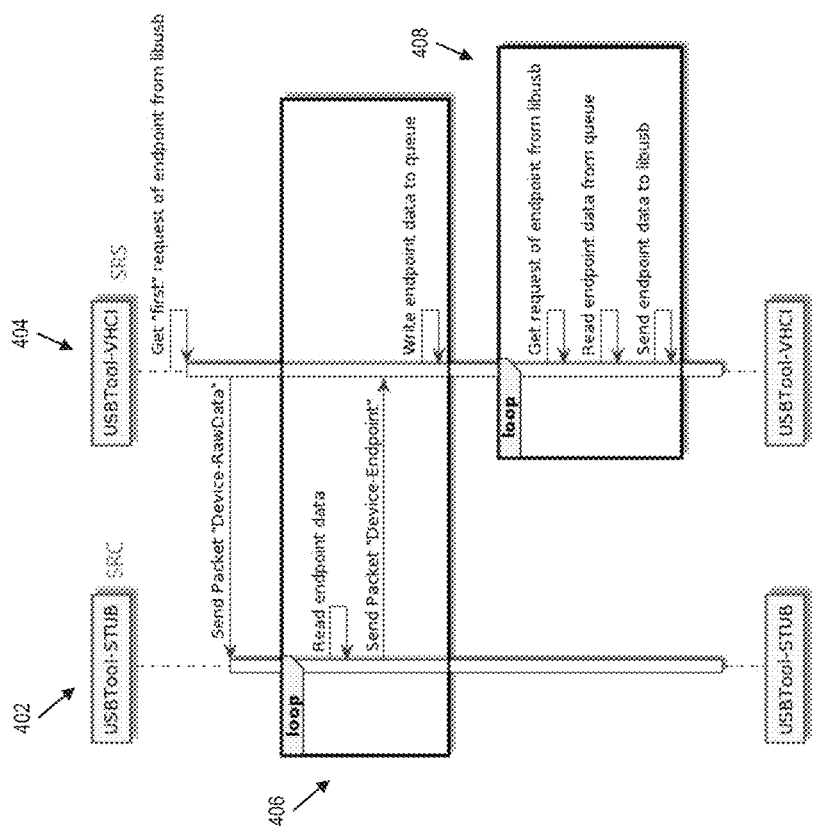
FIG. 4 depicts an example of a second workflow for redirection of a USB device, in accordance with some embodiments.

FIG. 4 depicts an example of a second workflow for redirection of a USB device, in accordance with some embodiments. As depicted in the workflow 400, a USB device may be connected, via a client computer, to a server using a stub driver 402 installed on the client computer and a VHCI driver 404 installed on the server. In some embodiments, the VHCI driver 404 gets a first request from the server for endpoint data of a USB device from a program installed on the server using libusb. libusb is a C library that provides generic access to USB devices. The VHCI driver 404 may send a packet containing a command to read data from the USB device to the stub driver 402. This packet is exemplified in system 400 as 'Packet "Device-RawData".' The stub driver 402 may read endpoint data available from the USB device and may send the data in packets to the VHCI driver 404, as shown by process 406. The VHCI driver 404 may then send the endpoint data to a queue on the server in packets. These data packets are exemplified in system 400 by 'Packet "Device-Endpoint".' The VHCI driver 404 may then send the data to a program using libusb that is installed on the server. The stub driver 402 then repeats the process of reading additional endpoint data available on the USB device and sending the additional endpoint data to the VHCI driver 404 to be written to the queue on the server, as shown by process 406. In some embodiments, when the VHCI driver 404 gets subsequent requests for endpoint data of the USB device, it may read the endpoint data available in the queue on the server and send the data to a program using libusb that is installed on the server, as shown by process 408.

Flowchart Descriptions

Figure 5:
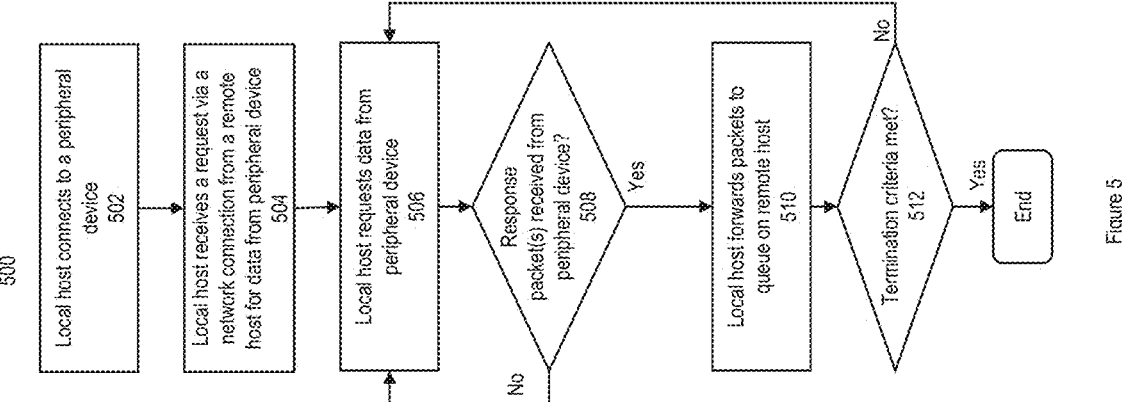
FIG. 5 shows a flowchart of a process for a local host to redirect the functionality of a peripheral device to a remote host using a push method, in accordance with one or more embodiments.

FIG. 5 shows a flowchart of a process for a local host to redirect the functionality of a peripheral device to a remote host using a push method, in accordance with one or more embodiments. In some embodiments, a local host connects to a peripheral device as indicated by block 502. The local host may include one or more of various types of computing device, such as a laptop, a desktop computer, a wearable headset, a smartphone, etc. In some embodiments, the actions taken by the local host in process 500 may be executed by one or more programs installed on the local host, including types of device drivers. The peripheral device may include various types of external devices, such as a game controller, a keyboard, a mouse, etc. The peripheral device may include various types of internal devices, such as a graphics card, an internal hard drive, etc. The connection between the peripheral device and the local host may include types of wired connections such as HDMI, VGA, serial ports, etc., or other types of wireless connections such as Bluetooth, Wi-Fi, etc. The remote host may include types of hardware computing devices or a type of virtual machine. The local host connects to the remote host via a network connection, such as the Internet, a local area network, a peer-to-peer network, etc.

In some embodiments, the local host receives a request from a remote host via a network connection for data from the peripheral device, as indicated by block 504. The request may be generated by a program installed on the remote host that is periodically checking for input data from the peripheral device connected to the local host. The remote host may include types of hardware computing devices and servers, or a type of virtual machine. The network connection may include the Internet, a local area network, a peer-to-peer network, etc. In some embodiments, the request may be received by a program installed on the local host.

In some embodiments, after receiving the request from the remote host in block 504, the local host may then send a request to the peripheral device for data, as indicated by block 506. For example, when the peripheral device is a USB device, a USB driver installed on the local host may poll an endpoint of the USB device to check if data is available.

Some embodiments may have the local host determine whether it has received one or more response packets from the peripheral device, as indicated by block 508. In some embodiments, the local host may determine that one or more response packets have been received from the peripheral device after the peripheral device provides a response packet in response to the request sent by the local host using operations described for block 506. If the local host determines that response packets were received from the peripheral device, operations of the process 500 may proceed to operations described for block 510. Otherwise, operations of the process 500 may proceed back to operations described for block 506.

In some embodiments, the local host may use the network connection to send the response packets received in block 508 to a queue on the remote host, as indicated by block 510. A queue may be a hardware or software entity with a first in, first out (FIFO) data structure that can maintain a collection of objects and allow objects to be added and removed in sequence. In some embodiments, a router may be used to direct the response packets from the local host to the remote host via the network connection. A software program installed on the remote host may direct the response packets to the queue once they are received. In some embodiments, the local host may place the response packets in the queue in the order they were received in during block 508 so that the remote host may retrieve them on a FIFO basis and process the information from the peripheral device (e.g. a mouse movement).

In some embodiments, the local host may determine whether specified termination criteria have been met, as indicated by block 512. In some embodiments, the local host may stop making the repeated requests when it detects that some termination criteria have been met. In some embodiments, the termination criteria may include a power-saving parameter such as a specified duration over which no response packets are received from the peripheral device. In some embodiments, the termination criteria may include the disconnection of the peripheral device from the local host, the disconnection of the remote server from the local host, a signal to stop requests generated on the local host, or a signal to stop requests generated on the remote server.

In response to a determination by the local host that the termination criteria have been met, operations of the process 500 may terminate. Otherwise, operations of the process 500 may proceed back to block 506.

It should be noted that the features and limitations described in any one embodiment may be applied to any other embodiment herein, and a flowchart or examples relating to one embodiment may be combined with any other embodiment in a suitable manner, done in different orders, or done in parallel. For example, operations of blocks 504 and 510 can be done in parallel. In addition, the systems and methods described herein may be performed in real-time. It should also be noted that the systems and/or methods described above may be applied to or used in accordance with other systems and/or methods.

Figure 6:
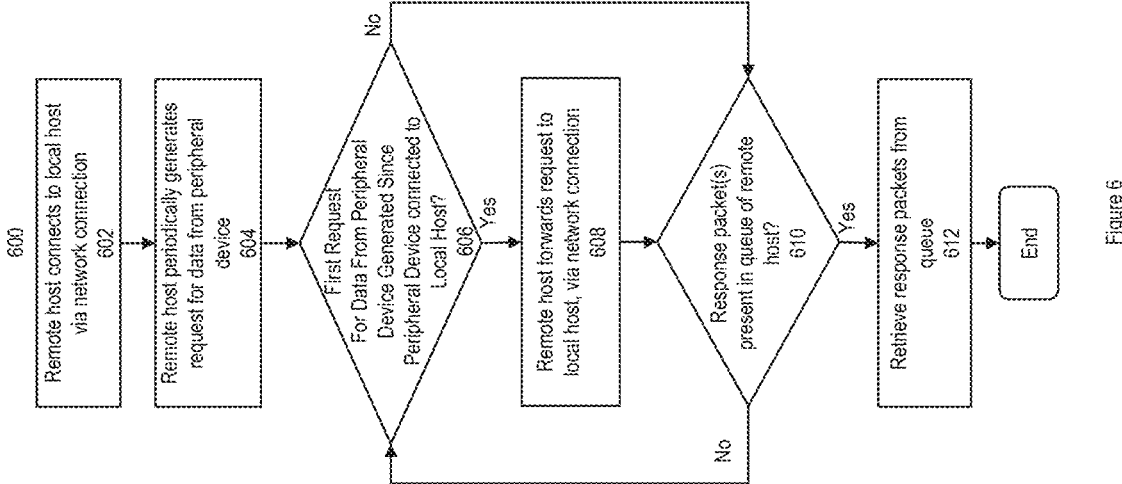
FIG. 6 shows a flowchart of a process for a remote host to access the functionality of a peripheral device connected to a local host using a push method, in accordance with one or more embodiments.

FIG. 6 shows a flowchart of a process for a remote host to access the functionality of a peripheral device connected to a local host using a push method, in accordance with one or more embodiments. In some embodiments, a remote host may connect to a local host via any network connection as indicated by block 602. The remote host may include types of devices as described in block 602. In some embodiments, the actions taken by the remote host in process 600 may be executed by one or more programs installed on the remote host, including types of device drivers. The local host may include one or more of various types of computing devices, as described in block 602. The network connection may include various types of wired or wireless connections, as described in block 602. The peripheral device may include various types of external or internal devices, as described in block 602.

In some embodiments, the remote host may periodically generate a request for data from the peripheral device, as indicated by block 604. In some embodiments, the request frequency may be determined by a specification provided by the peripheral device, the local host, or the remote host. For example, a program installed on the remote host may use a specification provided by a USB peripheral device to determine how often it sends an IN token packet requesting to read data from the USB peripheral device to an endpoint of the USB peripheral device. In this embodiment the application reads all endpoint information of the USB device to determine if it can enable push mode, but not to detect the read frequency. The application reads USB data at full speed. The actual reading frequency is automatically limited to a specific speed based on different device hardware.

In some embodiments, the remote host may determine whether the request is the first request for data from the peripheral device generated since the peripheral device connected to the local host, as indicated by block 606. In some embodiments, a remote host may determine that a request generated by the remote host using operations described for block 604 is a first request for data. In response to a determination by the remote host that it is the first request, operations of the process 600 may proceed to block 608. Otherwise, operations of the process 600 may proceed to block 610.

In some embodiments, the remote host may forward the request generated in block 604 for data from the peripheral device generated in block 604 to the local host, via the network connection, as indicated by block 608. For example, when the peripheral device is a USB device, a VHCI driver installed on the remote host may send a request for peripheral device data to a stub driver installed on the local host via an Internet connection.

In some embodiments, the remote host may determine whether response packets containing data from the peripheral device are present in a queue on the remote host, as indicated by block 610. If the remote host determines that there are response packets present in the queue, operations of the process 600 may proceed to block 612. Otherwise, operations of the process 600 may proceed back to block 604.

In some embodiments, the remote host may retrieve the response packets detected in block 610 from the queue, as indicated by block 612. The remote host may retrieve the packets in FIFO manner so that the packets are processed in the order they were received in. For example, the remote host may read the packets to display a mouse movement on a monitor connected to the remote host.

It should be noted that the features and limitations described in any one embodiment may be applied to any other embodiment herein, and a flowchart or examples relating to one embodiment may be combined with any other embodiment in a suitable manner, done in different orders, or done in parallel. For example, operations of blocks 604 and 612 can be done in parallel. In addition, the systems and methods described herein may be performed in real-time. It should also be noted that the systems and/or methods described above may be applied to or used in accordance with other systems and/or methods.

Figure 7:
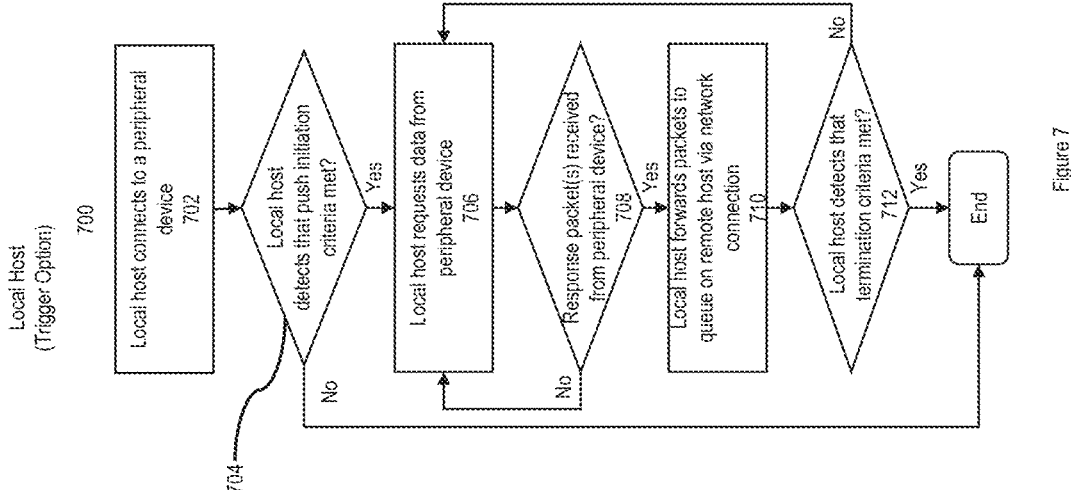
FIG. 7 shows a flowchart of a process for a local host to redirect the functionality of a peripheral device to a remote host that triggers a push method when specific initiation criteria have been met, in accordance with one or more embodiments.

FIG. 7 shows a flowchart of a process for a local host to redirect the functionality of a peripheral device to a remote host that triggers a push method when specific initiation criteria have been met, in accordance with one or more embodiments. Some embodiments may have a local host, which includes any computing device, connect to a peripheral device as indicated by block 702. The local host may include one or more of various types of computing devices, as described elsewhere in this disclosure, such as in block 702. The remote host may include types of devices as described elsewhere in this disclosure, such as in block 702. In some embodiments, the actions taken by the local host in process 700 may be executed by one or more programs installed on the local host, including types of device drivers. The network connection may include various types of wired or wireless connections, as described elsewhere in this disclosure, such as in block 702. The peripheral device may include various types of external or internal devices, as described elsewhere in this disclosure, such as in block 702.

In some embodiments, the local host may determine whether some specified push initiation criteria have been met to trigger the push method, as indicated by block 704. In some embodiments, the push initiation criteria may include the connection of the peripheral device to the local host, the connection of the remote server to the local host, the receipt of a request for data received from the remote server, or another signal generated on the local host or the remote server. For example, once the local host detects that the peripheral device has been connected to the remote host, it begins polling the device endpoint for data. In response to a determination that the push initiation criteria have been met, operations of the process 700 may proceed to block 706. Otherwise, operations of the process 700 may terminate.

In some embodiments, the local host may send a request to the peripheral device for data, as indicated by block 706. For example, when the peripheral device is a USB device, a USB driver installed on the local host may poll an endpoint of the USB device to check if data is available.

Some embodiments may have the local host determine whether it has received one or more response packets from the peripheral device, as indicated by block 708, in response to its request sent in block 706. If the local host determines that response packets were received from the peripheral device, operations of the process 700 may proceed to block 710. Otherwise, operations of the process 700 may proceed back to block 706.

In some embodiments, the local host may use the network connection to send the response packets received in block 708 to a queue on the remote host, as indicated by block 710. In some embodiments, the local host may place the response packets in the queue in the order they were received in during block 708 so that they may be retrieved by the remote host on a first in, first out (FIFO) basis.

In some embodiments, the local host may detect whether specified termination criteria have been met, as indicated by block 712. In some embodiments, the termination criteria may include various signals as described in block 712. In response to a determination that the termination criteria have been met, operations of the process 700 may terminate. Otherwise, operations of the process 700 may proceed back to block 706.

It should be noted that the features and limitations described in any one embodiment may be applied to any other embodiment herein, and a flowchart or examples relating to one embodiment may be combined with any other embodiment in a suitable manner, done in different orders, or done in parallel. For example, operations of blocks 706 and 710 can be done in parallel. In addition, the systems and methods described herein may be performed in real-time. It should also be noted that the systems and/or methods described above may be applied to or used in accordance with other systems and/or methods.

Figure 8:
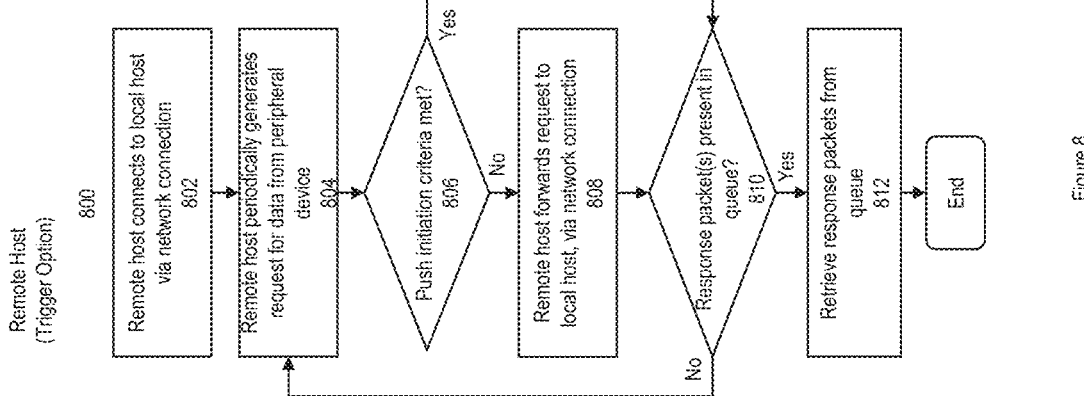
FIG. 8 shows a flowchart of a process for a remote host to access the functionality of a peripheral device connected to a local host that triggers a push method when specific initiation criteria have been met, in accordance with one or more embodiments.

FIG. 8 shows a flowchart of a process 800 for a remote host to access the functionality of a peripheral device connected to a local host by using a push method when specific initiation criteria have been met, in accordance with one or more embodiments. In some embodiments, a remote host may connect to a local host via any network connection as indicated by block 802. The remote host may include types of devices as described elsewhere in this disclosure, such as in block 802. In some embodiments, the actions taken by the remote host in process 800 may be executed by one or more programs installed on the remote host, including types of device drivers. The local host may include one or more of various types of computing devices, as described elsewhere in this disclosure, such as in block 802. The network connection may include various types of wired or wireless connections, as described elsewhere in this disclosure, such as in block 802.

In some embodiments, the remote host may periodically generate a request for data from a peripheral device connected to the local host, as indicated by block 804. The peripheral device may include various types of external or internal devices, as described elsewhere in this disclosure, such as in block 802. In some embodiments, the request frequency may be determined by a specification provided by the peripheral device, the local host, or the remote host. For example, a USB peripheral device may provide a specific polling rate of 125 Hz so the remote host generates a request to check peripheral device data once every 8 milliseconds.

In some embodiments, the remote host may determine whether some specified push initiation criteria to trigger the push process has been met, as indicated by block 806.

Otherwise, operations of the process 800 may proceed to block 808. In some embodiments, the push initiation criteria may include the connection of the peripheral device to the local host, the connection of the remote server to the local host, or another signal generated on the local host or the remote server. In response to a determination by the remote host that the push initiation criteria have been met, operations of the process 800 may proceed to block 810.

In some embodiments, the remote host may forward the request generated for data from the peripheral device generated in block 804 to the local host, via the network connection, as indicated by block 808. For example, when the peripheral device is a USB device, a VHCI driver installed on the remote host may send a request for peripheral device data to a stub driver installed on the local host via an Internet connection.

In some embodiments, the remote host may determine whether response packets containing data from the peripheral device are present in a queue on the remote host, as indicated by block 810. In response to a determination that there are response packets present in the queue, operations of the process 800 may proceed to block 812. Otherwise, operations of the process 800 may proceed back to block 804.

In some embodiments, the remote host may retrieve the response packets detected in block 810 from the queue, as indicated by block 812. The remote host may retrieve the packets in FIFO manner so that the packets are processed in the order they were received in. For example, some embodiments may retrieve response packets using operations similar to or the same as operations described for block 612.

It should be noted that any of the devices, equipment, or connections discussed in relation to systems, architectures, or workflows disclosed in FIGS. 1-4 could be used to perform one or more of the operations in FIGS. 5-8.

It should be noted that the features and limitations described in any one embodiment may be applied to any other embodiment herein, and a flowchart or examples relating to one embodiment may be combined with any other embodiment in a suitable manner, done in different orders, or done in parallel. For example, operations of blocks 804 and 812 can be done in parallel. In addition, the systems and methods described herein may be performed in real-time. It should also be noted that the systems and/or methods described above may be applied to or used in accordance with other systems and/or methods.

Figure 9:
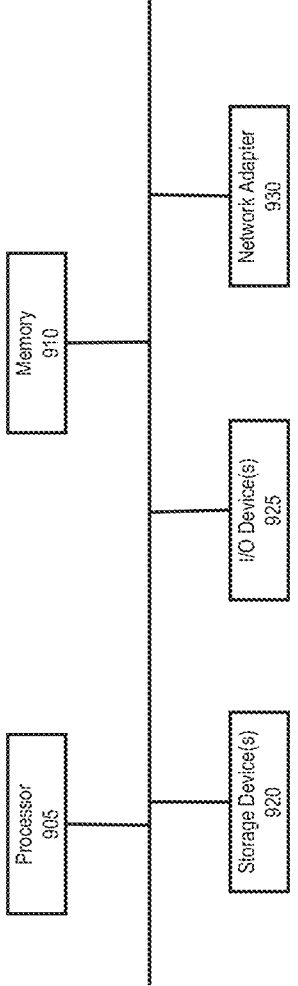
FIG. 9 is a block diagram of a computer system as may be used to implement certain features of some of the embodiments.

FIG. 9 is a block diagram of a computer system as may be used to implement certain features of some of the embodiments. The computer system 900 may include a set of central processing units ("set of processors") 905, memory 910, input/output devices 925, e.g. keyboard and pointing devices, touch devices, display devices, storage devices 920, e.g. disk drives, and network adapters 930, e.g. network interfaces, that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), an IIC (I2C) bus, or an Institute of Electrical and Electronics Engineers (IEEE) standard 1394 bus, also called FireWire.

The memory 910 and storage devices 920 are computer-readable storage media that may store program instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The program instructions stored in memory 910 can be implemented as software and/or firmware to program the set of processors 905 to carry out actions described above, such as one or more operations described in FIGS. 4-8. In some embodiments, such software or firmware may be initially provided to the computer system 900 by downloading it from a remote system through the computer system 900, e.g. via network adapter 930.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

With respect to the components of computer devices described in this disclosure, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Further, some or all of the computer devices described in this disclosure may include a user input interface and/or user output interface, e.g. a display, for use in receiving and displaying data. In some embodiments, a display such as a touchscreen may also act as a user input interface. It should be noted that in some embodiments, one or more devices described in this disclosure may have neither user input interfaces nor displays and may instead receive and display content using another device, e.g. a dedicated display device such as a computer screen and/or a dedicated input device such as a remote control, mouse, voice input, etc. Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments. For example, it is to be understood that the present invention contemplates that, to the extent possible, one or more features of any embodiment may be combined with one or more features of any other embodiment.

As used throughout this application, the word "may" is used in a permissive sense, i.e. meaning having the potential to, rather than the mandatory sense, i.e. meaning must. The words "include," "including," "includes," and the like mean including, but not limited to. As used throughout this application, the singular forms "a," "an," and "the" include plural referents unless the context clearly indicates otherwise. Thus, for example, reference to "an element" or "an element" includes a combination of two or more elements, notwithstanding use of other terms and phrases for one or more elements, such as "one or more." The term "or" is non-exclusive, i.e. encompassing both "and" and "or", unless the context clearly indicates otherwise. Terms describing conditional relationships, e.g. "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g. "state X occurs upon condition Y obtaining" is generic to "X occurs solely upon Y" and "X occurs upon Y and Z". Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects, e.g. one or more processors performing steps/operations A, B, C, and D, encompass both all such attributes or functions being mapped to all such objects and subsets of the attributes or functions being mapped to subsets of the objects, e.g. both all processors each performing steps/operations A-D, and a case in which processor 1 performs step/operation A, processor 2 performs step/operation B and part of step/operation C, and processor 3 performs part of step/operation C and step/operation D, unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property, i.e. each does not necessarily mean each and every. Limitations as to sequence of recited steps should not be read into any claims unless explicitly specified, e.g. with explicit language like "after performing X, performing Y", in contrast to statements that might be improperly argued to imply sequence limitations, e.g. "performing X on items, performing Y on the X'ed items," used for purposes of making claims or embodiment descriptions more readable rather than specifying sequence. Statements referring to "at least Z of A, B, and C" and the like, e.g. "at least Z of A, B, or C," refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining," or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A method for redirection of a peripheral device, connected to a first computing device, to a second computing device via a network connection, comprising:
   connecting a first computing device to a second computing device via a network connection;
   connecting the first computing device to a peripheral device;
   initiating repeated packet requests for data from the peripheral device from the first computing device to the peripheral device, wherein the repeated packet requests cause the peripheral device to transmit response packets of data to the first computing device; and
   redirecting the response packets from the first computing device to a queue on the second computing device;
   wherein the first computing device continues initiating packet requests for data from the peripheral device without requiring another request from the second computing device; and
   wherein the first computing device continues forwarding any response packets received from the peripheral device to the queue on the second computing device.

2. The method of claim 1, wherein the second computing device fetches the response packets from the queue whenever the second computing device initiates a packet request for peripheral device data.

3. The method of claim 1, said peripheral device comprising any of:
   a tablet;
   a computer mouse;
   a game controller;
   a keyboard;
   a microphone;
   a webcam;
   an external hard drive; and
   an internal device comprising any of:
      a graphics card; and
      an internal hard drive.

4. The method of claim 2, wherein the second computing device fetches the response packets from the queue on a FIFO (first in, first out) basis.

5. The method of claim 1, wherein the first computing device pushes data to the second computing device by repeatedly to sending requests for data to the peripheral device without waiting for requests from the second computing device;
   wherein whenever the peripheral device provides data to the first computing device the first computing device forwards the response packets to the queue on the second computing device; and
   wherein when the second computing device triggers another request for data, the second computing device retrieves any available response packets directly from the queue without sending the request to the first computing device and without waiting until the first computing device sends the data via the network connection.

6. The method of claim 1, wherein said first computing device detects whether certain push initiation criteria have been met to trigger generation of the repeated requests for data from the peripheral device, wherein said push initiation criteria comprise actions comprising any of:
   connection of the peripheral device to the first computing device;
   connection of the second computing device to the first computing device;

a signal to start requests generated on the first computing device; and a signal to start requests generated on the second computing device.

7. The method of claim 1, wherein when the first computing device detects that the peripheral device is connected to the second computing device it begins polling the peripheral device for data.

8. The method of claim 1, wherein the first computing device stops making repeated requests when the first computing device detects that termination criteria have been met, wherein the termination criteria comprise any of:

a power-saving parameter;

a specified duration over which no response packets are received from the peripheral device;

disconnection of the peripheral device from the first computing device;

disconnection of the second computing device from the first computing device;

a signal to stop requests generated on the first computing device; and a signal to stop requests generated on the second computing device.

9. The method of claim 1, wherein the first computing device comprises a USB stub driver installed thereon that communicates with a virtual host controller interface (VHCI) driver installed on the second computing device via the network connection;

wherein the stub driver repeatedly checks for endpoint data from the peripheral device and forwards any available data packets to the queue on the second computing device; and wherein the VHCI driver retrieves the data packets in the queue on subsequent requests for data from the peripheral device.

10. The method of claim 1, wherein the peripheral device comprises a USB device in communication with a USB host controller;

wherein a USB host controller driver (HCD) installed on the first computing device transmits information to and from the USB device via the USB host controller; and wherein a stub driver installed on the first computing device shares the USB device between the first computing device and the second computing device by exchanging USB request packets with a VHCI driver installed on the second computing device.

11. The method of claim 10, wherein the VHCI driver receives a request from the second computing device for endpoint data of a USB device from a program installed on the second computing device using a library that provides generic access to USB devices;

wherein the VHCI driver sends a packet containing a command to read data from the USB device to the stub driver;

wherein the stub driver reads endpoint data available from the USB device and sends the data in packets to the VHCI driver; and wherein the VHCI driver sends the data to a program that is installed on the second computing device.

12. The method of claim 10, wherein the VHCI driver receives a first request from the second computing device for endpoint data of a USB device from a program installed on the second computing device using a library that provides generic access to USB devices;

wherein the VHCI driver sends a packet containing a command to read data from the USB device to the stub driver;

wherein the stub driver reads endpoint data available from the USB device and sends the data in packets to the VHCI driver;

wherein the VHCI driver sends the endpoint data to a queue on the second computing device;

wherein the stub driver repeatedly reads additional endpoint data available on the USB device and sending the additional endpoint data to the VHCI driver to be written to the queue on the second computing device; and wherein when the VHCI driver receives subsequent requests for endpoint data of the USB device, the VHCI driver reads the endpoint data available in the queue on the second computing device and sends the data to a program that is installed on the second computing device.

13. The method of claim 1, further comprising:

a plurality of peripheral devices connected to the first computing device;

wherein the first computing device independently initiates repeated requests for data to each of said plurality of peripheral devices.

14. The method of claim 13, wherein the first computing device combines multiple data points and requests received from one or more peripheral devices into a single packet and then send the single data packet to the second computing device.

15. The method of claim 14, wherein said combining is triggered when the first computing device detects that a rate of consumption at the second computing device is low compared to a rate of data generation on the one or more peripheral devices.

16. The method of claim 1, wherein a program installed on the second computing device uses a specification provided by the peripheral device to determine how often to send a token packet requesting to read data from the peripheral device to an endpoint of the peripheral device.

17. The method of claim 16, wherein the peripheral device provides a specific polling rate; and wherein the second computing device regularly generates a request to check for peripheral device data based on said specific polling rate.

18. A method for redirection of a peripheral device, connected to a first computing device, to a second computing device via a network connection, comprising:

connecting to a first computing device from a second computing device via a network connection, wherein the first computing device is connected to a peripheral device; and receiving response packets of peripheral device data from the first computing device via the network connection in a queue on the second computing device, wherein the first computing device has made repeated packet requests for data from the peripheral device and redirected the response packets from the peripheral device to the second computing device;

wherein the first computing device continues initiating packet requests for data from the peripheral device without requiring another request from the second computing device;

and wherein the first computing device continues forwarding any response packets received from the peripheral device to the queue on the second computing device.

19. The method of claim 18, further comprising;
fetching the response packets from the queue on the second computing device whenever the second computing device initiates a packet request for peripheral device data.

20. A method for redirection of a peripheral device, connected to a first computing device, to a second computing device via a network connection, comprising:
connecting a first computing device to a second computing device via a network connection;
connecting the first computing device to a peripheral device;
detecting that push initiation criteria have been met;
initiating repeated packet requests for data from the peripheral device from the first computing device to the peripheral device, wherein the repeated packet requests causes the peripheral device to transmit response packets of data to the first computing device; and
redirecting the response packets from the first computing device to a queue on the second computing device;
wherein the first computing device continues initiating packet requests for data from the peripheral device without requiring another request from the second computing device; and
wherein the first computing device continues forwarding any response packets received from the peripheral device to the queue on the second computing device.

21. The method of claim 20, further comprising:
the second computing device fetching the response packets from the queue whenever the second computing device initiates a packet request for peripheral device data.

22. The method of claim 20, wherein said push initiation criteria comprise actions comprising any of:
connection of the peripheral device to the first computing device;
connection of the second computing device to the first computing device;
a signal to start requests generated on the first computing device; and
a signal to start requests generated on the second computing device.

23. A method for redirection of a peripheral device, connected to a first computing device, to a second computing device via a network connection, comprising:
connecting to a first computing device from a second computing device via a network connection, wherein the first computing device is connected to a peripheral device;
receiving response packets of peripheral device data from the first computing device via the network connection in a queue on the second computing device, wherein the first computing device has made repeated packet requests for data from the peripheral device and redirected the response packets from the peripheral device to the second computing device; and
detecting that push initiation criteria have been met;
wherein the first computing device continues initiating packet requests for data from the peripheral device without requiring another request from the second computing device; and
wherein the first computing device continues forwarding any response packets received from the peripheral device to the queue on the second computing device.

24. The method of claim 23, further comprising:
fetching the response packets from the queue on the second computing device whenever the second computing device initiates a packet request for peripheral device data.

25. The method of claim 23, wherein said push initiation criteria comprise actions comprising any of:
connection of the peripheral device to the first computing device;
connection of the second computing device to the first computing device;
a signal to start requests generated on the first computing device; and
a signal to start requests generated on the second computing device.

26. A method redirection of a USB device, connected to a first computing device, to a second computing device via a network, comprising: connecting a first computing device to a second computing device via a network connection;
connecting a USB device to the first computing device;
waiting for the second computing device to send a packet request for USB device data to the first computing device;
initiating repeated packet requests for USB device data from the first computing device to the USB device; and
transmitting response packets from the USB device to a queue on the second computing device via the network connection in response to the packet requests from the first computing device;
wherein the first computing device continues initiating packet requests for data from the USB data device without requiring another request from the second computing device;
and wherein the first computing device continues forwarding any response packets received from the USB data device to the queue on the second computing device.

27. The method of claim 26, further comprising:
fetching the response packets from the queue on the second computing device whenever the second computing device initiates subsequent packet requests for USB device data.

28. The method of claim 26, wherein the first computing device comprises a USB stub driver installed thereon that communicates with a virtual host controller interface (VHCI) driver installed on the second computing device via the network connection;
wherein the stub driver may repeatedly check for endpoint data from the USB device and forwards any available data packets to the queue on the second computing device; and
wherein the VHCI driver retrieves the data packets in the queue on subsequent requests for data from the peripheral device.

29. The method of claim 26, wherein the USB device is in communication with a USB host controller;
wherein a USB host controller driver (HCD) installed on the first computing device exchanges information with the USB device via the USB host controller; and
wherein a stub driver installed on the first computing device shares the USB device between the first computing device and the second computing device by exchanging USB request packets with a VHCI driver installed on the second computing device.

30. The method of claim 29, wherein the VHCI driver receives a request from the second computing device for endpoint data of a USB device from a program installed on the second computing device using a library that provides generic access to USB devices;

wherein the VHCI driver sends a packet containing a command to read data from the USB device to the stub driver;

wherein the stub driver reads endpoint data available from the USB device and sends the data in packets to the VHCI driver; and wherein the VHCI driver sends the data to a program that is installed on the second computing device.

31. The method of claim 29, wherein the VHCI driver receives a first request from the second computing device for endpoint data of a USB device from a program installed on the second computing device using a library that provides generic access to USB devices;

wherein the VHCI driver sends a packet containing a command to read data from the USB device to the stub driver;

wherein the stub driver reads endpoint data available from the USB device and sends the data in packets to the VHCI driver;

wherein the VHCI driver sends the endpoint data to a queue on the second computing device in packets;

wherein the stub driver repeatedly reads additional endpoint data available on the USB device and sending the additional endpoint data to the VHCI driver to be written to the queue on the second computing device; and wherein when the VHCI driver receives subsequent requests for endpoint data of the USB device, the VHCI driver reads the endpoint data available in the queue on the second computing device and sends the data to a program that is installed on the second computing device.

32. An apparatus, comprising:

a USB device;

a first computing device connected to said USB device; and a second computing device connected to said first computing device via a network connection, said second computing device further comprising a queue;

wherein the first computing device is configured to wait for the second computing device to send a packet request for USB device data to the first computing device;

wherein the first computing device is configured to initiate repeated packet requests for USB device data from the first computing device to the USB device; and wherein the first computing device is configured to redirect the USB device by transmitting response packets from the USB device to the queue on the second computing device via the network connection in response to the packet requests from the first computing device;

wherein the first computing device continues initiating packet requests for data from the USB device without requiring another request from the second computing device; and wherein the first computing device continues forwarding any response packets received from the USB device to the queue on the second computing device.

33. The apparatus of claim 32, wherein the second computing device is configured to fetch the response packets from the queue on the second computing device whenever the second computing device initiates subsequent packet requests for USB device data.

34. The apparatus of claim 33, wherein:

the first computing device further comprises a USB stub driver installed thereon;

the second computing device further comprising a virtual host controller interface (VHCI) driver installed thereon;

wherein the stub driver is configured to communicate via the network connection with the virtual host controller interface (VHCI) driver;

wherein the stub driver is configured to repeatedly check for endpoint data from the USB device and to forward any available data packets to the queue on the second computing device;

wherein the VHCI driver is configured to retrieve the data packets in the queue on subsequent requests for data from the peripheral device.

35. The apparatus of claim 34, further comprising:

a USB host controller; and wherein the USB device is in communication with the USB host controller;

wherein the first computing device further comprises a USB host controller driver (HCD) installed thereon that is configured to transmit information to and from the USB device via the USB host controller; and wherein the stub driver shares the USB device between the first computing device and the second computing device by exchanging USB request packets with the VHCI driver.

* * * * *